United States Patent [19]
Buntin

[11] 3,811,957
[45] May 21, 1974

[54] BATTERY SEPARATORS MADE FROM POLYMERIC FIBERS

[75] Inventor: Robert R. Buntin, Baytown, Tex.

[73] Assignee: Esso Research and Engineering Company, Linden, N.J.

[22] Filed: June 29, 1972

[21] Appl. No.: 267,325

Related U.S. Application Data

[63] Continuation-in-part of Ser. No. 843,839, July 22, 1969, abandoned, which is a continuation-in-part of Ser. No. 787,258, Dec. 26, 1968, abandoned.

[52] U.S. Cl. ................................. 136/146, 136/148
[51] Int. Cl. ............................................. H01m 3/00
[58] Field of Search ........................... 136/143–146, 136/148, 142; 264/126, 119; 161/150; 156/167, 180; 19/144.5, 155

[56] References Cited
UNITED STATES PATENTS

| | | | |
|---|---|---|---|
| 2,482,062 | 9/1949 | Hanson | 136/146 |
| 3,002,040 | 9/1961 | Orsino et al. | 136/146 |
| 3,055,966 | 9/1962 | Sundberg | 136/146 |
| 3,084,091 | 4/1963 | Volkman et al. | 136/148 X |
| 3,216,864 | 11/1965 | Bushrod et al. | 136/148 |
| 3,354,247 | 11/1967 | Zehender et al. | 136/148 X |

OTHER PUBLICATIONS

Wente, Industrial and Engineering Chemistry, Vol. 48, No. 8 (1956), pages 1,342–1,346.

*Primary Examiner*—Anthony Skapars

[57] ABSTRACT

A battery separator and the process for preparing it, having excellent abrasion resistance, stiffness, porosity, pore size, and electrical resistance is produced from a non-woven mat of randomly laid, self-bonded polymeric fibers. The mat is produced by a melt-blowing process. The non-woven mat is then compacted, in a critical manner, preferably at temperatures for polypropylene of from 290° to 310° F., using relatively low pressures, i.e., 10 psi/in$^2$ or less, to obtain a battery separator meeting precise and essential specifications.

17 Claims, 3 Drawing Figures

BATTERY SEPARATORS MADE FROM POLYMERIC FIBERS

CROSS-REFERENCES TO RELATED APPLICATIONS

This is a continuation-in-part application of Ser. No. 843,839 filed July 22, 1969, now abandoned, entitled "Battery Separators Made from Polypropylene Fibers" which in turn is a continuation-in-part of Ser. No. 787,258 filed Dec. 26, 1968, now abandoned, entitled "Battery Separators from Polypropylene."

BACKGROUND OF THE INVENTION

1. Field of the Invention.

The present invention is directed to rigid, tough, fine-fibered non-woven polymeric, particularly polypropylene or polystyrene battery separators, and methods for producing them. These have been critically constructed to have the proper characteristics of porosity, stiffness, abrasion resistance, etc.

2. Prior Art.

The commercially used battery separators are mainly of two types: (1) resin impregnated paper and (2) microporous rubber. The most commonly used material in auto batteries is resin impregnated paper. But, this material is rather brittle and is more susceptible to acid deterioration than is desirable.

The microporous rubber separators are also more brittle than is desired and are much more costly than the resin impregnated paper. The microporous rubber separators are used mostly in industrial battery applications.

It has been long recognized by the industry that battery separators made from polyolefins would possess the property of acid and alkaline resistance. But in spite of numerous and elaborate attempts, polyolefin battery separators possessing other essential properties such as stiffness, abrasion resistance, proper porosity, etc., have eluded the art. Examples of battery separators made from polyolefins, specifically polypropylene, described in the art are illustrated in the following patents:

| U.S. 3,002,040 | U.S. 3,092,438 |
|---|---|
| 3,026,366 | 3,314,821 |
| 3,045,058 | 3,351,495 |
| 3,055,966 | |

A particularly pertinent patent is U.S. Pat. No. 2,482,062. This teaches the preparation of battery separators from polystyrene fibers and other thermoplastics such as polyethylene having very small fiber sizes, i.e., diameters less than 5 microns with a degree of compaction between 30 and 60 percent. This patent recognizes the significance of small fiber size as one of the components determining proper porosity. Nevertheless, the battery separator of the present application is a decided improvement over the battery separator of U.S. Pat. No. 2,482,062 because it embodies all of the necessary attributes for a commercial fibrous polymeric battery separator, not just small fiber size.

Another pertinent series of references is typified by Wente in Industrial and Engineering Chemistry, Volume 48, No. 8 (1956), pages 1,342–1,346. The same information essentially also appears in two Naval Research reports, i.e., Naval Research Laboratory Report No. 111437, Apr. 15, 1954, and NRL Report 5265 dated Feb. 11, 1955 entitled "An Improved Device for the Formation of Super-fine, Semi-Plastic Fibers."

Although Wente shows a process for making mats of super-fine thermoplastic fibers, he has no concept of using the particular, critical processing features of this invention in order to convert the mat into a battery separator which possesses the controlling criteria of proper porosity, profer stiffness, proper abrasion resistance, etc.

SUMMARY OF THE INVENTION

Battery separators comprised of inert acid and base-resistant thermoplastics, particularly polypropylene and/or polystyrene fibers, possessing the controlling factors of proper porosity, proper stiffness, proper electrical resistance, proper abrasion resistance, etc., are prepared from melt-blown polypropylene or polystyrene mats which are compacted in a precisely controlled manner at relatively low pressures, i.e., less than 10 psi, and within a highly critical temperature range, i.e., 280° to 320° F., preferably 290° to 310° F. for polypropylene. An optional but preferred feature is the inclusion of a fused, embossed or extruded rib structure on these battery separator structures. They can also be made rewettable by using described techniques.

DESCRIPTION OF THE PREFERRED EMBODIMENTS

Figure 1:
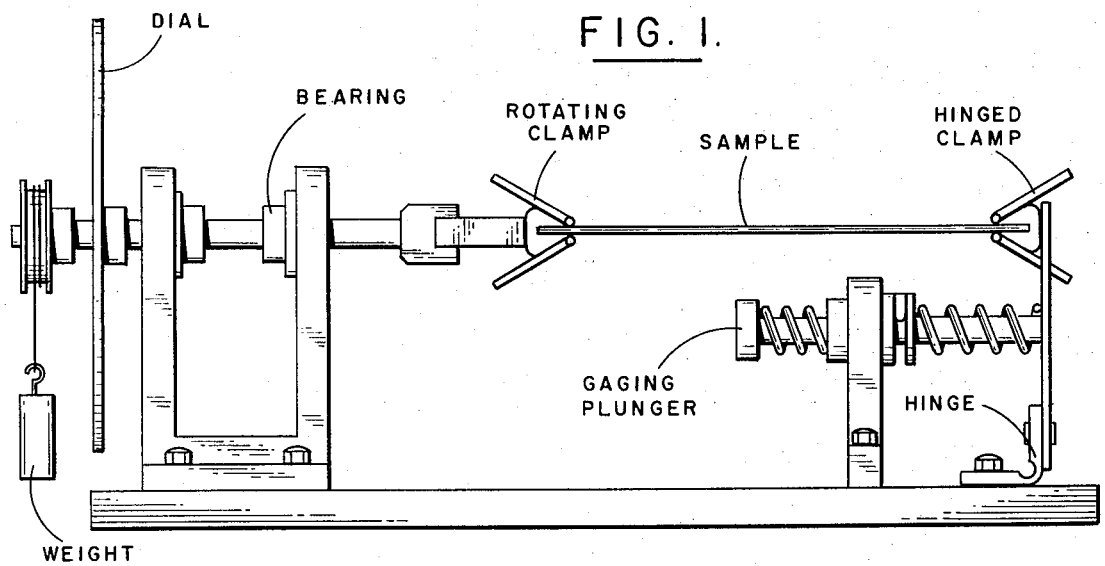

For convenience, the invention will be described using polypropylene, although it will be understood that, in general, the same considerations apply to polystyrene and other suitable polymers unless specifically otherwise stated. The non-woven polypropylene structures of the present invention are preferably produced by a melt-blowing process which comprises thermally treating the polypropylene and forcing the thermally treated polypropylene into a die head having a row of die openings. The extruded polypropylene is forced into a gas stream formed by gas jets adjacent to both sides of the die openings.

Polypropylene is thermally treated at temperatures in excess of 600° F. and preferably within the range of 620° to 800° F., usually in the extruder feeding the die head and in the die head itself, or may be treated in a separate step prior to being introduced into the extruder. The polypropylene as it is extruded out of the die openings into the gas stream is attenuated into fine fibers which are collected on a moving collecting device such as a drum to form a non-woven mat.

The gas flow is controlled so that the fibers as they are attenuated do not come into contact one with the other which results in "rope" and fiber bundles. The gas flow may vary over a wide range. The gas, preferably air, is heated and the flow controlled to produce very fine fibers (less than 10 microns). Suitable polypropylene mats have been obtained at air rates between 0.7 and 4 pounds/minute and the polypropylene fibers are attenuated in the gas stream at those rates such that their average diameter is less than about 10 microns.

The fibers are collected as a self-supporting mat on a collecting device such as a rotating drum at distances of about 1 to 18 inches from the die openings. Preferably a mat of self-bonded fibers is collected at a distance between 3 to 8 inches. A "self-bonded" mat as used herein means that the mat is a coherent, integral structure capable of withstanding normal handling such as winding, unwinding, cutting, pressing, calendering, etc., without losing its essential matlike character.

In most mats used in the present invention, some thermal bonding occurs. The mat produced by the melt-blowing process is produced so as to have a basis weight of between 100 and 500 grams/square meter. The thickness of the non-woven mat will vary between 40 and 200 mils.

In general, the melt-blowing process is carried out in accordance with the detailed procedures described in Ser. No. 227,769 entitled "Non-Woven Mats by Melt Blowing" filed Feb. 22, 1972, the disclosure of which is hereby incorporated by reference in its entirety.

While the non-woven mats are specifically referred to herein as polypropylene mats, polymers other than polypropylene can be melt blown and compacted to obtain a non-woven battery structure of compacted fibers meeting the specifications and properties detailed later herein.

The suitable polymers which may be melt blown are other acid and base-resistant fiber-forming thermoplastics as illustrated by polystyrene, polymethylmethacrylate and other polyolefins such as polyethylene, polybutene, polymethylpentene or ethylene-propylene copolymers. Nylons and polyesters are especially suitable for alkaline battery separators. Mixtures or blends of such polymers also can be used.

To produce a battery separator from the nonwoven mat produced by the melt-blowing process, the mat must be compacted to obtain the desired thickness and porosity as well as the mechanical properties of strength, abrasion resistance, etc.

The non-woven mat is compacted to a thickness of between 10 and 50 mils to be useful as a battery separator in most batteries. The compacting is preferably carried out by a critically controlled thermal compacting operation utilizing calender rolls or a press and shims or spacers to obtain a non-woven mat of fixed thickness.

The compacting is a highly critical portion of the process and must be carried out quite precisely with great attention to detail in order to produce a battery separator which will possess the essential commercial qualities, especially those of porosity, stiffness, electrical resistance and abrasion resistance.

In short, the compacting is carried out in a manner adequate to satisfy several parameters. Some of these are:

a. the thickness of the resulting structure should be constant,
b. the structure itself is formed or compacted under constant gap conditions, and
c. the pressure applied to the surface of the mat, when it is parallel to the shims or spacers which are used to form the constant gap, must not in general exceed 10 psi, usually being only somewhat over 0 psi, and preferably in the order of 2 to 8 psi.

When compacting is carried out in accordance with these criteria and in conjunction with and in light of the critical temperatures to be described as follows, satisfactory separators of commercial quality can be produced.

It is highly important that temperatures between 280° and 320° F. be used with polypropylene and with the relatively low pressures.

For polypropylene, preferably temperatures of 290° to 310° F. and most preferably 295° to 305° F. are used.

At low temperatures, for example, within the range of between 80° and 120° F. but at high pressure such as 2,500 psi or greater, the compacted non-woven polypropylene mat has a high porosity but poor stiffness and abrasion resistance.

When relatively high temperatures and high compacting pressures are used, products of adequate stiffness and abrasion resistance are produced but they have inadequate porosity.

When low pressures and low temperatures are used, products of good porosity but inadequate stiffness and abrasion resistance are produced.

Both the temperature and the compacting pressures are highly critical interrelated factors. If the temperatures exceed about 320° F., even at low compacting pressures, the article will fuse and requisite porosity will be lost, even though the product will have adequate stiffness and abrasion resistance.

It is only by operating within the specified temperature range and at the specified pressures that a polypropylene battery separator having (1) the proper porosity, (2) the proper stiffness, and (3) the proper abrasion resistance can be produced.

In general, when polystyrene battery separators are to be made, the compacting conditions are as described, but the temperatures will be from 175° to 195° F., preferably 185° to 190° F.

The requirement for stiffness has its genesis in the conventional operations of the battery separator industry. In that industry, equipment and machinery have been designed and used for a good many years with very stiff battery separators. Therefore, a battery separator, even though it has excellent properties under actual battery conditions and excellent economics in terms of the material cost and fabrication must be sufficiently rigid. Thus, to be acceptable, it must be able to be handled by the existing capital equipment.

A most essential prerequisite of this handling requirement is that the battery separators be stiff. However, it was soon learned that making a stiff thermoplastic fiber battery separator while still retaining the necessary qualities of porosity was an extremely difficult task. A great deal of research and development effort was utilized in order to find the precise set of conditions that would produce a battery separator that would meet all of the prerequisites that are absolutely essential to perform well as a commercial battery separator.

Although stiffness and toughness, i.e., measured herein as abrasion resistance, are factors which have been mentioned above, another important property of a battery separator is that it have good compression resistance, that is, that it not be squeezed out of shape when subjected to high compressive forces. It has been found that the battery separators of this invention prepared utilizing the critical process conditions of compacting and temperature also have good compressive strengths. These compressive resistance properties are amplified considerably when the ribs are of the fused variety described above.

Further, it has been found that to overcome a problem of glazing or glass-like surface, a material can be utilized between the non-woven mat and the pressing surface. Examples of such materials which can be used as spacers are kraft paper, tissue paper, writing paper, fine cotton cloth, linen, etc., which have a rough surface.

Non-woven mats pressed without such spacer materials tend to adhere to the metal plate surfaces of the press and the surface of the non-woven mat will become slick and film-like.

In lieu of a spacer material, Teflon coated metal pressing surfaces can also be used.

The compacting operation can be carried out preferably in a continuous operation such as by use of calender rolls but also can be carried out in a batch-type pressing operation. In either approach, a compressed non-woven mat of a fixed thickness is desired.

To obtain the fixed thickness, a shim or spacer should be used between the pressing plates or calender rolls, with the required pressure to obtain a predetermined, fixed thickness.

For production of battery separators on a large scale, calendering will probably be a more economic mode than static pressing.

Calendering involves passing continuous sheets of a non-woven mat between two rolls.

Since the mat material is exposed to the compaction of the rolls for a relatively brief space of time, it is necessary to preheat the material so that it is at the proper critical temperature as it passes through the rolls. The rolls themselves are also heated. Otherwise the residence time in the rolls is insufficient to adequately heat the mats to the critical temperatures.

The rolls are spaced or gapped appropriately so as to conform to the critical pressure ranges detailed elsewhere herein.

When the embossing is carried out in such a manner that the pressures at a particular point forming the ribs are very high, the thermoplastic material will fuse into a hard molded rib. This is highly preferable, since it not only adds to the stiffness of the overall battery separator, but it enables exceptional performance under actual battery conditions, where the ribs must touch the battery plates and not be susceptible to abrasion and compression from these plates.

In producing a battery separator, if fused ribs are not needed, an embossed pattern or rib can be pressed into the non-woven polypropylene structure to obtain battery separators with a desired design configuration. The embossing or the forming of ribs is preferably carried out at the same time the nonwoven polymer mat is pressed to the fixed thickness in the compacting operation.

Suitable techniques for incorporating ribs or battery separators are described in Ser. No. 149,677 filed June 3, 1971, Ser. No. 163,206 filed July 16, 1971 and Ser. No. 163,207 filed July 16, 1971, now abandoned, which are incorporated herein in their entirety by reference.

The non-woven structures of the present invention are especially useful in the lead-acid batteries of the SLI-type (starting, lighting and ignition) and the industrial type. These batteries have positive electrodes and negative electrodes which are separated by the battery separators.

It has been found that a non-woven polypropylene structure having a basis weight between 150 to 300 grams/square meter is preferred for producing battery separators of this type. The non-woven structure is compacted to a thickness which is preferably between 15 to 35 mils and a porosity preferably of 50 percent or greater.

The maximum pore size in a non-woven structure of the present invention is generally below 25, i.e., from 5 to 22, preferably 7 to 20, microns in the better quality sheets. The maximum pore size is a measurement of the largest pore or opening in the compacted structure to be used as a battery separator and is measured essentially by the ASTM-D-128-61 test procedure entitled "Maximum Pore Diameter and Permeability of Rigid Porous Filters for Laboratory Use."

The pore size of a battery separator is a very important characteristic. Low pore sizes provide an effective barrier to active material growing through and bridging between opposite plates of the battery, i.e., treeing, and thereby causing shorting.

But in order to achieve low electrical resistance, a high percent porosity is generally required in battery separators. The problem is to reconcile two antagonistic properties. Thus, in general, increasing the percent porosity also increases pore size because the distance between adjacent fibers increases.

As a feature of this invention, it was found that an effective way to decrease pore size and retain an adequate level of porosity is to drastically decrease the fiber size in the non-woven structure.

By forming the same weight of thermoplastic into very small fibers and randomly distributing these fibers, the fiber-to-fiber distance is reduced and thus smaller pores are obtained. The very small fiber sizes, i.e., below $10\mu$ utilized in the present invention thus make possible the unique and important combination of low electrical resistance and small pore size in the non-woven structure.

The perception to recognize the connection and relationship between the polyolefin fibers of a melt-blown process (which are extremely small) and the possibility of their use for battery separators is part of the inventive concept. Until now, fibers small enough to provide the requisite high porosity were simply not available by any known process, notwithstanding U.S. Pat. No. 2,482,062.

One of the major achievements of this invention is to provide a polyolefin battery separator which combines all of the requisite, commercial properties of a battery separator. These are: high porosity, small pore size, low electrical resistance, good abrasion resistance, and excellent stiffness.

Thus, to prepare a battery separator with all of these properties is a significant achievement since many of these properties are antagonistic to each other. That is, that if one maximizes one of these important properties, one is liable to minimize one or more of the other important properties. Therefore, every property must be obtained in the light of the effect it has on all the other properties of the battery separators.

Thus, for another example, one normally desires a high abrasion resistance in a battery separator. This enables the separator to provide a long service life. But electrical resistance must also be low. These two properties have an inverse linear relationship to each other. Therefore, a compromise must be made between low electrical resistance and high abrasion resistance. This has been successfully achieved in the battery separator of the invention.

Another example is the relationship of maximum pore size with electrical resistance. Thus, generally a compacted web with relatively small values of maximum pore size are the prerequisite for battery separators. But in order to achieve small pore size, one must increase the solid fraction. When one increased the solid fraction, a concomitant result is a rapid increase in electrical resistance. Thus, these antagonistic properties must be balanced off.

Stiffness, i.e., tortional stiffness, is related to the solid fraction, web thickness and the degree of bonding. For any desired solid fraction and web thickness, the degree of bonding is controlling. It has been found and forms a central feature of this invention that the degree of bonding is determined by compacting techniques. Thus, compacting should be accomplished at relatively high temperatures, but at substantially less than melting point for good tortional stiffness. This has been discussed elsewhere.

Various tests are used to ascertain the essential characteristics of the battery separator. A discussion of some of these is as follows.

Basis Weight

Here 10 separators are weighed and the total weight ($W_{10}$) taken. The average height and thickness are also determined. These are then used in the formula as follows:

$$BW = 155 \times W_{10}/(h)(w)$$

where
$h$ = height
$w$ = width and
$W_{10}$ = weight (total);
$BW$ = basis weight
Solid fraction ($SF$) is calculated as follows:

$$SF = \text{Basis weight}/C(t)$$

where
$t$ = Average web thickness which is measured on the separators per se.
$C$ = A constant which is $23.1 \times 10^3$ for polystyrene and $26.9 \times 10^3$ for polystyrene.
Void fraction = 1 − (solid fraction).

Electrical resistance determinations are carried out according to "Test Procedure for Determination of Electrical Resistance of Battery Separators" issued by the Association of American Battery Manufacturers, Inc., 19 North Harrison St., East Orange, New Jersey.

Pore size determinations are carried out according to ASTM D-2499-66T entitled "Pore Size Characteristics of Membrane Filters for Use with Aerospace Fluids," or the ASTM-E-128-61 test previously mentioned.

Tortional stiffness measurements are carried out on a stiffness tester which is illustrated in FIG. 1.

The procedure, in general, is to cut 20 strips from separators which have ribs thereon. 10 of the strips have eight ribs perpendicular to their long axis. Ten other strips have one rib running the full longitudinal length. The strips are ¾ inch wide by 4½ inches long.

The gauging plunger is turned a quarter of a turn and the plunger is locked in extended position.

One end of the test strip is inserted in the sample support and the other end is inserted in the hinged sample support.

Then the gauging plunger is rotated until the roll pin drops into the recess on the guide bushing.

Then the dial retaining spring is depressed and the angular rotation produced by a 3.33-gram load is read.

The dial is then rotated back to the locked position; the string with the test weight is wrapped around the pulley in the opposite direction.

The dial retaining spring is then depressed and the angular rotation produced by a 3.33-gram test load is read.

The procedure is repeated for another nine test strips.

Then the average degree of rotation for the sample in the two directions is calculated.

Finally, the average value of tortional rotation ($TS_{11}$) parallel to the ribs and the average value perpendicular to the ribs ($TS_1$) is calculated as $TS_{11} = 13.32/X_{11}$ and $TS_1 = 13.32/X_1$. These give stiffness determinations in two directions: one parallel to the ribs and the other perpendicular to the ribs. The average of the two is taken as the tortional stiffness.

Figure 2:
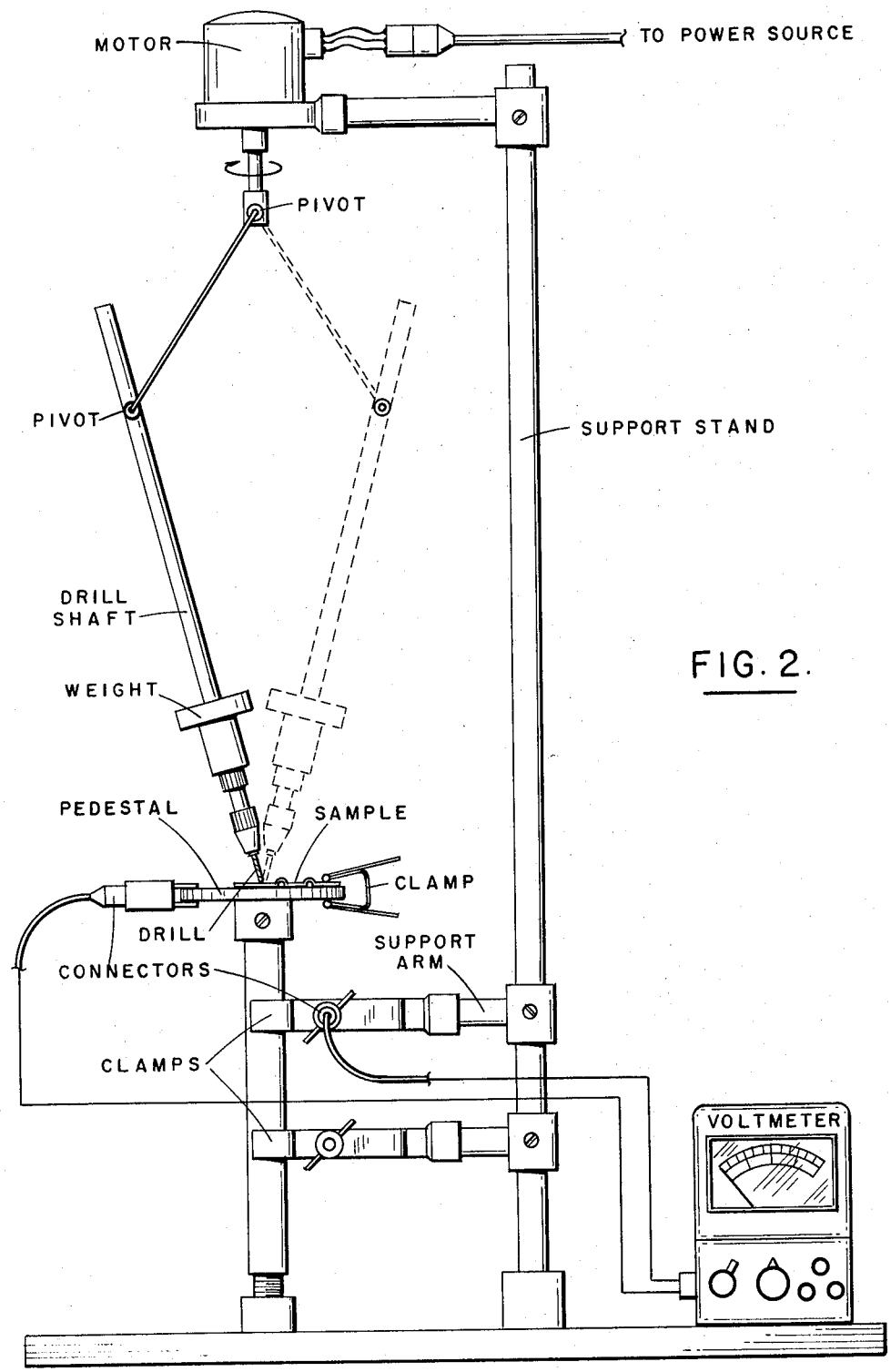

As was the situation with tortional stiffness, abrasion resistance is determined in an apparatus (illustrated in FIG. 2) which was also designed by Applicant and his fellow researchers, since devices available to the industry were not satisfactory.

In brief, the apparatus employs the principle of contacting the sample with an angled drill bit which simultaneously turns in a circular arc and rotates about its longitudinal axis. One turn and one rotation occur every second and are called a cycle. The sample is mounted in the sample pedestal and the flutes of the drill are angled or pivoted so that they ride directly on the sample. When the drill bit penetrates the sample battery separator, it will complete a circuit through the metallic components of the apparatus and the change in current will show on a voltmeter connected into the circuit. The time interval for each test is measured with a stopwatch.

The sample is mounted on a pedestal and secured by a binder clip. The pedestal has a hollow chamber beneath it so as to provide a receptacle for the penetrating drill bit. A No. 65 (.035 inch) drill is used. The drill is held in a pin vise manufactured by the L. S. Sterrett Company. The motor is a Hurst Model CA 60 rpm electrical motor.

The actual testing is carried out by cutting four sample coupons from each battery separator and testing each coupon sample in a test sequence. The drive motor and a stopwatch are started simultaneously upon initiation of the test sequence. The stopwatch is stopped when the resistance on the meter has dropped to zero.

The motor speed is timed to be one revolution per second. Therefore, the time interval in seconds read off the stopwatch is taken as the number of cycles of abrasion that the sample survived before failure.

Figure 3:
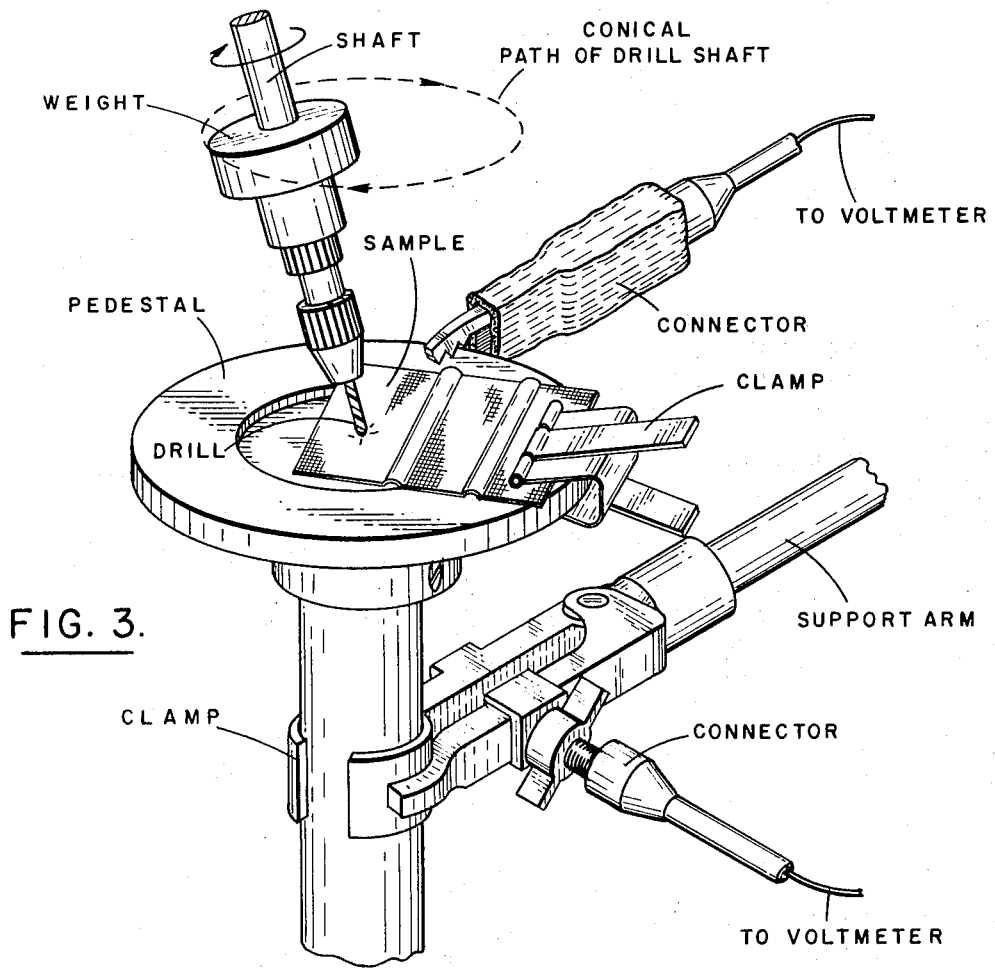

The same test is repeated on the other seven coupons. The only difference is that one of the drill flutes is used for the odd numbered coupons and the other drill flute is used for the even numbered coupons. The average of the eight sequences on the eight coupons is taken as being the abrasion resistance in cycles per second. FIG. 3 shows the abrasion apparatus in more detail.

Since there are a great many variables and parameters that are interrelated and must mesh to make an acceptable polyolefin battery separator, these are summarized below in Table A.

TABLE A

| BATTERY SEPARATOR PROPERTIES | NON-WOVEN POLYOLEFIN | | |
|---|---|---|---|
| Properties (Ranges) | General | Preferred | Most Preferred |
| A. Separators | | | |
| Basis Weight | 100 – 400 gms/m$^2$ | 150 – 350 gms/m$^2$ | 175 – 325 gms/m$^2$ |
| Thickness | 10 – 50 mls | 15 – 35 mls | 20 – 30 mls |
| Porosity (Percent Void Fraction) | 40 to 70 | 50 to 65 | 55 to 60 |
| Maximum Pore Size ($\mu$) | 5 – 25 | 5 – 20 | 7 – 20 |
| Electrical Resistance Ohm/in$^2$ | <0.040 | <0.025 | <0.020 |
| Fiber Size $\mu$ | < 10 | < 5 | < 2 |
| Abrasion Resistance Number of Cycles | 50–800 | 80–600 | 80–500 |
| Torsional Stiffness Grams-cm/degree | 0.25 to 1.5 | 0.3 to 1.0 | 0.5 to 0.9 |
| Solid Fraction | 0.3 to 0.6 | 0.35 to 0.5 | 0.4 to 0.45 |
| B. Process Conditions* | | | |
| Compacting Temperature of ±5°F. | 280 to 320 | 290 to 310 | 295 to 305 |
| Compacting Pressures psi | about 1 to 10 | 2 to 8 | 4 to 7 |
| Compacting Time, seconds** | 1 to 60 | 5 to 40 | 5 to 30 |

* For polypropylene.
** The time is about 0.01 to 4, preferably 0.05 to 3, most preferably 0.5 to 1.5, seconds for calendering. Otherwise, except as described, the conditions are approximately the same. Therefore, the time range to include both calendering and flat pressing would be 0.01 to 60, preferably 0.05 to 40, and most preferably 0.5 to 30 seconds.

Careful attention to the temperature conditions at the surface of the mat during the compacting is exceedingly important. It has now been found that in earlier experiments the temperature was not measured accurately. The source of the error was in the measurement of the temperature in the heating block which block was about 20° cooler than the actual temperature being applied to the mat.

Furthermore, even now, temperatures can only be measured reasonably accurately, i.e., about plus or minus 5° F.

Therefore, it has been discovered and forms an important feature of this invention that a proper empirical technique should be used to ascertain the best temperature to be used for a given mat.

That technique comprises of selecting the highest temperature at which fusion does not occur, i.e., about 320° F., for polypropylene.

Separators are made at that temperature. If porosity is not adequate, then sample separators are made at progressively lower temperatures until the temperature is found for that batch of mats which will form separators fitting within the critical parameters discussed above.

Thus, of necessity, there is a "zeroing in" approach of finding the fusion temperatures and progressively lowering the temperature below the fusion temperature in 2°, 3° or 5° increments until the best temperature in the range is found. Generally, that temperature will be about 300° F. for polypropylene. For other polymers and resins, greatly different temperatures will be needed.

Nevertheless, it is important and to be specifically noted that, in general, the proper temperature for achieving the critical parameters of the battery separators of the invention will range quite considerably below the melting point of a particular polymer. As a rule of thumb, that point will be about 5° to 20° F., preferably 5° to 15° F., above the softening point of the polymer and 5° to 50°, preferably 5° to 35° F., below the melting point.

The present invention will be further illustrated by the following specific examples which are not limitations on the scope of the invention.

EXAMPLE 1

Non-woven polypropylene mats were produced by the melt-blowing process under conditions summarized in Table I hereinafter.

Table I

| Mat Number | 1 | 2 | 3 | 4 |
|---|---|---|---|---|
| Resin | - - 33.6 melt flow rate - - - | | | |
| Die Temp. °F. | 590 | 585 | 550 | 580 |
| Air Temp. °F. | 670 | 650 | 560 | 644 |
| Polymer Rate gm/min. | 7.1 | 7.1 | 6.2 | 7.9 |
| Air Rate min./inch | 0.33 | 0.33 | 1.07 | 1.265 |
| Collector distance in. | 4.5 | 4.5 | 4.0 | 6.0 |
| TPM | 30 | 20 | 34 | 1.0 |

Mats No. 1 and No. 2 were produced at low air rates and the fibers in the mats had varying diameter sizes from 12 to 45 microns, i.e., relatively coarse. The basis weight of mat No. 1 was 300 grams per square meter, whereas that of mat No. 2 was 200 grams per square meter.

Mats No. 3 and No. 4 were produced at high air rates, and the fibers in the mats were of a diameter of 2 microns or less, i.e., relatively fine diameter. The basis weight of mat No. 3 was 300 grams per square meter. Three mats were produced under the conditions of mat No. 4, and their basis weights were 270, 266, and 256 grams per square meter, respectively.

EXAMPLE 2

The following example illustrates the compacting operation and shows that the mechanical and electrical properties of the non-woven polypropylene structures are highly dependent on the compacting conditions used. In Table II hereinafter the mechanical properties of the structures are set forth after compacting under various conditions. The electrical properties important to battery separators are set forth in Table III.

Table III also illustrates that important properties of non-woven polypropylene structures can be varied by changing the fiber size and/or bulk density (basis weight). Higher bulk densities will result in smaller pore size, which is desirable, but also lower porosities which are not desirable. And, therefore, the electrical resistance is affected adversely by being raised to an undesirably high figure.

Suitable surfactant materials for wetting out the non-woven polypropylene structures are anionic surfactants, such as aliphatic sulfates, for example, sodium dioctylsulfosuccinate (commercially sold as Aerosol-OT) or non-ionic surfactants such as polyethenoxy compounds, for example, nonylphenoxy poly(ethyleneoxy)ethanol (commercially sold as IGEPAL CO-730). The surfactants are used at a concentration of between about 0.01 and 0.5 weight percent, based on total weight of solution.

The separators of Example 2 were dipped in a heated

TABLE II

| Separator | Mat | Compacting Conditions | Thickness mils | Mechanical Properties |
|---|---|---|---|---|
| 1 | 1 | Flat Press. Room Temp., 1700 psi | 31 | Fuzzy surface, delaminates on wetting, poor stiffness |
| 2 | 3 | Flat Press. Room Temp., 1700 psi | 24.1 | Fair surface, poor abrasion resistance |
| 3 | 1 | Flat Press. 150° F., 1700 psi | 17.2 | Slick surface, delaminates on wetting, poor abrasion resistance |
| 4 | 2 | Flat Press. 150° F., 1700 psi | 12.8 | Slick surface, poor abrasion resistance; very limp |
| 5 | 1 | Calendered, 1400 lb/pli Room Temp. | 21.0 | Fuzzy surface, delaminates on wetting |
| 6 | 1 | Calendered, 1400 lb/pli 150° F. | 19.8 | Slick surface, poor abrasion resistance; very limp |
| 7[1] | 4 | Flat press., 300° F. | 23.6 | Excellent |
| 8[1] | 4 | Flat press., 300° F. | 28.1 | Excellent |
| 9[1] | 4 | Flat press, 300° F. | 33.6 | Excellent |
| 10[1] | 1 | Flat press, 330° F. | 17.2 | Melted into impermeable film |

[1]These mats were prepared at pressures of less than 10 psi, i.e. at approximately 7 psi, with spacer shims set at approximately the thickness in mils indicated in the appropriate column.

It can be seen from the data above in Table II that the battery separators produced were of excellent quality when the temperature was about 300° F. and the pressures were less than 10 psi. When the temperatures exceeded about 315° or 320° F., i.e, 330° F. even at low pressures, the battery separator fused into an impermeable slab, which was useless as a battery separator.

solution of 0.25 weight percent IGEPAL CO-730 and heated to a temperature of 200° F. After immersion in the solution for about 5 minutes, they were removed and placed in a 35 to 40 weight percent acid solution to be completely wetted out, and the electrical resistance was then measured. The results are summarized below in Table III.

TABLE III

| Separator Number | Mat Number | Maximum Pore Size, Microns | Electrical Resistance ohm in$^2$ | Porosity Percent |
|---|---|---|---|---|
| 1 | 1 | 62 | 0.025 | 57 |
| 2 | 3 | 10 | 0.043 | 46 |
| 3 | 1 | 22 | 0.078 | 23 |
| 4 | 2 | 30 | 0.034 | 32 |
| 5 | 1 | 32 | 0.042 | 37 |
| 6 | 1 | 21 | 0.102 | 34 |
| 7 | 4 | 8 | 0.034 | 44 |
| 8 | 4 | 9.5 | 0.024 | 53 |
| 9 | 4 | 12 | 0.017 | 61 |

EXAMPLE 3

One of the characteristics of polypropylene is that it is not easily wettable by aqueous materials, even strongly acidic aqueous materials. Since it is important that battery separators be wetted, i.e., by the sulphuric acid in a battery, it has been found that one way of producing structures which are so wettable is to conduct a "wet-out" operation. This process generally consists of immersing the battery separators in a surfactant which is maintained at a temperature of between 160° and 210° F.

As illustrated for separators Nos. 7–9, the unique combination of low pore size, low resistance, and high porosity can be obtained in the non-woven battery separators of this invention. Thus, the fibers are very fine and have a diameter less than 10 microns and preferably less than 5 microns.

Thus, it is apparent that a combination of interrelated properties has been melded together to produce polymer fiber battery separators possessing good to excellent properties in all the major categories.

The wetting technique described in Ser. No. 163,207 entitled "Battery Separator Manufacturing Process"

and Ser. No. 149,677 entitled "Rewettable Battery Separator," both of which are incorporated herein by reference, in their entirety can also be used, as can the embossing technique described therein. That embossing technique can also be used to produce fused ribs.

The process and description above have been primarily directed to techniques for making battery separators from melt-blown webs and the battery separators per se resulting therefrom. It is also to be noted that the general melt-blowing process and the webs produced therefrom can also be additionally beneficially modified in accordance with the following to produce novel and unobvious articles suited to a wide variety of uses:

a. The Liquid Blowing Agent Concept

Although the disclosure, thus far, has indicated that the blowing agent is gaseous, particularly air, there are some situations in which it would be preferable that a liquid blowing agent be used. This could be water or an organic solvent. It would depend upon the particular polymers being processed and the particular effect desired from the use of the liquid. In those instances, the use of liquids would confer economic advantages as well as novel products.

b. The Use of Thermoset Polymers

The melt-blown process, although normally thought of as being useful only for thermoplastic materials, can also be used for thermoset materials which are adapted to be processed in thermoplastic equipment. There are a considerable number of thermosets which can be injection molded and otherwise handled as a thermoplastic material. One class of these materials that is particularly useful are phenolics, since they are relatively inexpensive. Furthermore, non-woven mats made from phenolics would have great utility as a flame resistant material for use as insulation. It would also have advantages compared to glass fibers normally used, in that phenolic fibers would not be abrasive to the skin nor create fine particles which could be harmful upon breathing.

c. Polymer Solutions and Emulsions

The technique of the melt-blowing process can also be utilized for producing fibers at relatively low temperatures. The melt-blowing process is usually thought of as being restricted to molten plastics. But, it is possible to prepare solutions of polymers or emulsions containing polymers which can be handled at far lower temperatures and with much greater ease which when subjected to the fiber-forming forces at the ambient conditions prevailing will solidify and form fibers. The solvent or emulsifying carrier medium would be conveyed away by the action of the blowing agent. As pointed out above, this need not be air but could be gas, and in some situations might even be designed to interact with the particular solvent or carrier fluid to dispose of it more readily.

For instance, a solution of polyvinyl acetate could be melt-blown in order to produce polyvinyl alcohol fibers which upon exposure to air would solidify.

d. Synthetic Pulp

The fibers emanating and produced from the melt-blowing process are very fine and can be handled and treated as a synthetic pulp for paper making. The process can be adjusted to make these relatively short and they can be used either in combination with conventional wood fibers or used by themselves and deposited from a water suspension or mingled with the wooden or cellulose fibers during a conventional paper making process where they are laid down on screens simultaneously with the wood pulp and the resulting product is a composite of cellulose and thermoplastic fibers.

e. Coating Fibers

It is possible to use the fluid, e.g., gaseous or liquid blowing agent, as a carrier medium to coat the fibers emanating from the melt-blown process with various materials. For instance, powder, pigments, dyes, surfactants, viscosity modifiers, adhesives and the like could all be applied to the surfaces of the fibers in this manner. Also the fluid stream could be used to mix other fibers and particulates with the fibers so they are collected together with the melt-blown fibers to form composites with improved and unusual properties.

f. Web Impregnation

The webs made from the melt-blowing process can be impregnated with resin-forming materials. The impregnating materials can be applied from solutions or from suspensions of film-forming compositions which are either preformed or in monomeric form where they can be polymerized in situ. The impregnating materials can include phenolics, melamines, epoxies, silicons, polyesters, acrylics, styrene, vinyl chloride and the like.

Where preformed polymeric solids are used, they will comprise about 35 to 80 percent of the impregnating solution. The resulting materials can be used for any applications where conventional cellulose fiber filaments and paper, paperboard, nonwovens or other matrices are used.

A particular advantage of the non-wovens is that they can be used in environments where the water resistance of cellulose is inadequate and precludes their use.

Furthermore, the non-woven webs from the melt-blowing process can be used as reenforcing materials for applications which require conventional fibrous reenforcements.

There are several applications where the use of polymeric mats produced by the melt-blown process would make superior reenforcing materials because of (1) their interaction with the particular polymer that is being enforced, (2) superior strength, and (3) superior water resistance. An example would be polyesters, phenolics, urea-melamine epoxy, phenolic unsaturated polyester resins and the like.

The same approach could be used for producing hard composites for use as circuit boards and related applications.

g. Agricultural Uses

Non-woven mats with little or no compaction made from ultra violet sensitive polymers, such as polypropylene, can be effectively used as mulches which will eventually decompose and biodegrade upon exposure to the sun and elements. Since the fibers have so much more surface area than film, degradation can occur without the necessity for special photodegradation agents.

Webs are considerably easier to handle than film. Furthermore, seeds, fertilizers, pesticides, fungicides and the like can be inserted or impregnated into the webs to produce special combinations of benefits.

The webs permit the ground to breathe to some extent and can be treated to permit water penetration.

Webs can also be used as physical supports to actually grow plants since the roots can easily penetrate the interstices of the webs. With nutrients, the webs can be used as a hydrophonic support. They are also useful in this regard, since they can be maintained and made sterile so easily, e.g., boiling, ethylene oxide treatment, etc.

Small containers can be formed from the webs which will retain water, permit breathing, hold nutrients, permit root penetration. These can be used by nurseries in place of peat pots, etc.

h. Membranes

The polyolefin non-woven mats made from the melt-blown process also have unique applicability as relatively large pore membranes.

They can be prepared carefully in the absence of surfactants and surface oxidation to have low water wettability. Therefore, they can be used as membranes to permit the ready passage of vapors or non-aqueous liquids, but will be a barrier to liquids.

Unusual separations can be effected with this novel membrane.

I claim:

1. A polymeric battery separator article comprising a mat of compacted inert polymeric fibers less than 10 microns in size wherein said article is characterized as follows:
   a. basis weight — 100 to 400 grms/in.$^2$
   b. thickness — 10 to 50 mls.
   c. porosity (percent void fraction) — greater than 40 percent and up to 70 percent
   d. maximum pore size — 5–25$\mu$
   e. electrical resistance — less than 0.040 ohms/in.$^2$
   f. abrasion resistance — 50 to 800 cycles and above
   g. tortional stiffness — 0.25 to 1.5 cm/degree
   h. solid fraction — 0.3 to 0.6.

2. An article according to claim 1 wherein said polymeric fibers are polypropylene.

3. An article according to claim 1 wherein said polymeric fibers are polystyrene.

4. An article according to claim 1 where the characteristics of said article are:

| | |
|---|---|
| Basis Weight | 150–350 gms/m$^2$ |
| Thickness | 15–35 mls |
| Porosity (Percent Void Fraction) | 50–65 |
| Maximum Pore Size ($\mu$) | 5–20 |
| Electrical Resistance Ohm/in$^2$ | <0.025 |
| Fiber Size $\mu$ | <5 |
| Abrasion Resistance Number of Cycles | 80–600 |
| Torsional Stiffness Grams-cm/degree | 0.3–1.0 |
| Solid Fraction | 0.35–0.5. |

5. An article according to claim 1 wherein the characteristics of said article are:

| | |
|---|---|
| Basis Weight | 175–325 gms/m$^2$ |
| Thickness | 20–30 mls |
| Porosity (Percent Void Fraction) | 55–60 |
| Maximum Pore Size ($\mu$) | 7–20 |
| Electrical Resistance Ohm/in$^2$ | <0.020 |
| Fiber Size $\mu$ | <2 |
| Abrasion Resistance Number of Cycles | 80–500 |
| Torsional Stiffness Grams-cm/degree | 0.5–0.9 |
| Solid Fraction | 0.4–0.45. |

6. An article according to claim 4 wherein said polymeric fibers are polypropylene.

7. An article according to claim 4 wherein said polymeric fibers are polystyrene.

8. An article according to claim 5 wherein said polymeric fibers are polypropylene.

9. An article according to claim 1 wherein ribs are either extruded, embossed or fused on said separator.

10. A process for making outstanding battery separators which conform to the characteristics specified for the battery separators of claim 1 which comprises in combination the steps of:
   a. forming a non-woven polypropylene mat from a melt-blowing process which has polypropylene fibers less than 10 microns thick and the basis weight is 100 to 400 gms/in.$^2$
   b. compacting said mat utilizing fixed spacers or shims to a uniform thickness of 10 to 50 mils,
     i. at a temperature of from 280° to 320° F.,
     ii. at a pressure of about 1 to 10 psi and
     iii. at a time interval of from 0.01 to 30 seconds wherein said spacers or shims prevent large pressures from being applied directly to the mat surfaces.

11. A process according to claim 10 wherein the conditions are as follow:

| | |
|---|---|
| Compacting Temperature of ±5° F. | 290–310 |
| Compacting Pressures psi | 2–8 |
| Compacting Time, seconds | 0.1–60. |

12. A process according to claim 10 wherein the conditions are as follow:

| | |
|---|---|
| Compacting Temperature of ±5° F. | 295–305 |
| Compacting Pressures psi | 4–7 |
| Compacting Time, seconds | 0.05–30. |

13. A process according to claim 10 wherein calendering is utilized to effect such compacting.

14. A battery separator article according to claim 1 wherein said polymeric fibers are nylon.

15. A polymeric battery separator article according to claim 1 wherein said polymeric fibers are polyester.

16. A process for making outstanding battery separators which conform to the characteristics specified for the battery separators of claim 1 which comprises in combination the steps of:
   a. forming a non-woven mat from a melt-blowing process which has thermoplastic fibers less than 10 microns thick and a basis weight of 100 to 400 grams/in.$^2$
   b. compacting said mat utilizing fixed spacers or shims to a uniform thickness of 10–50 mils, at
     i. a pressure of about 1–10 psi,
     ii. a time interval of from 0.01 to 30 seconds wherein said spacers or shims prevent large pressures from being applied directly to the mat surfaces,
     iii. a temperature about 5° to 20° F. above the softening point of said thermoplastic and 5° to 35° F. below the melting point of said thermoplastic.

17. A process according to claim 16 wherein said thermoplastic is polystyrene.

* * * * *